Patented June 11, 1929.

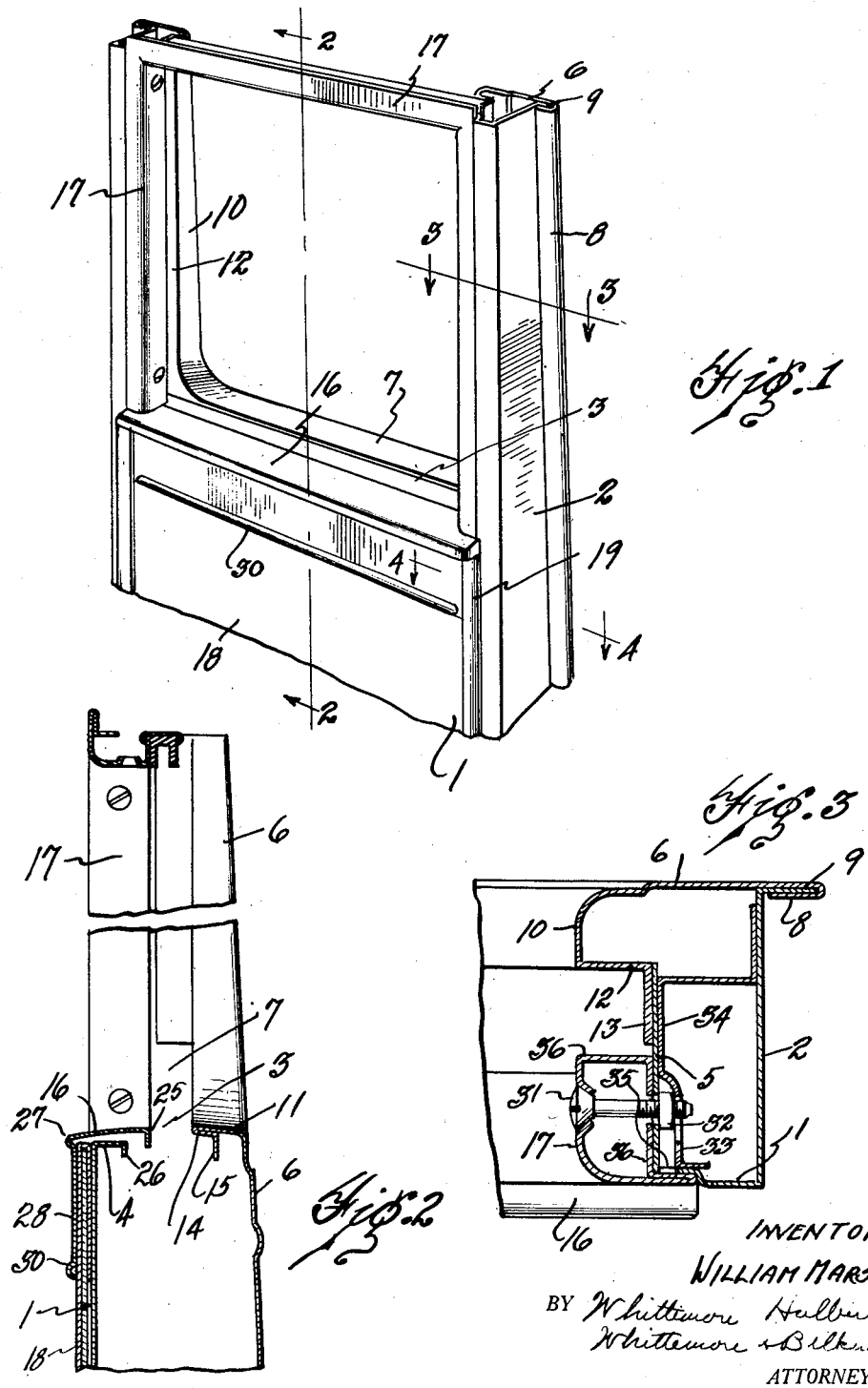

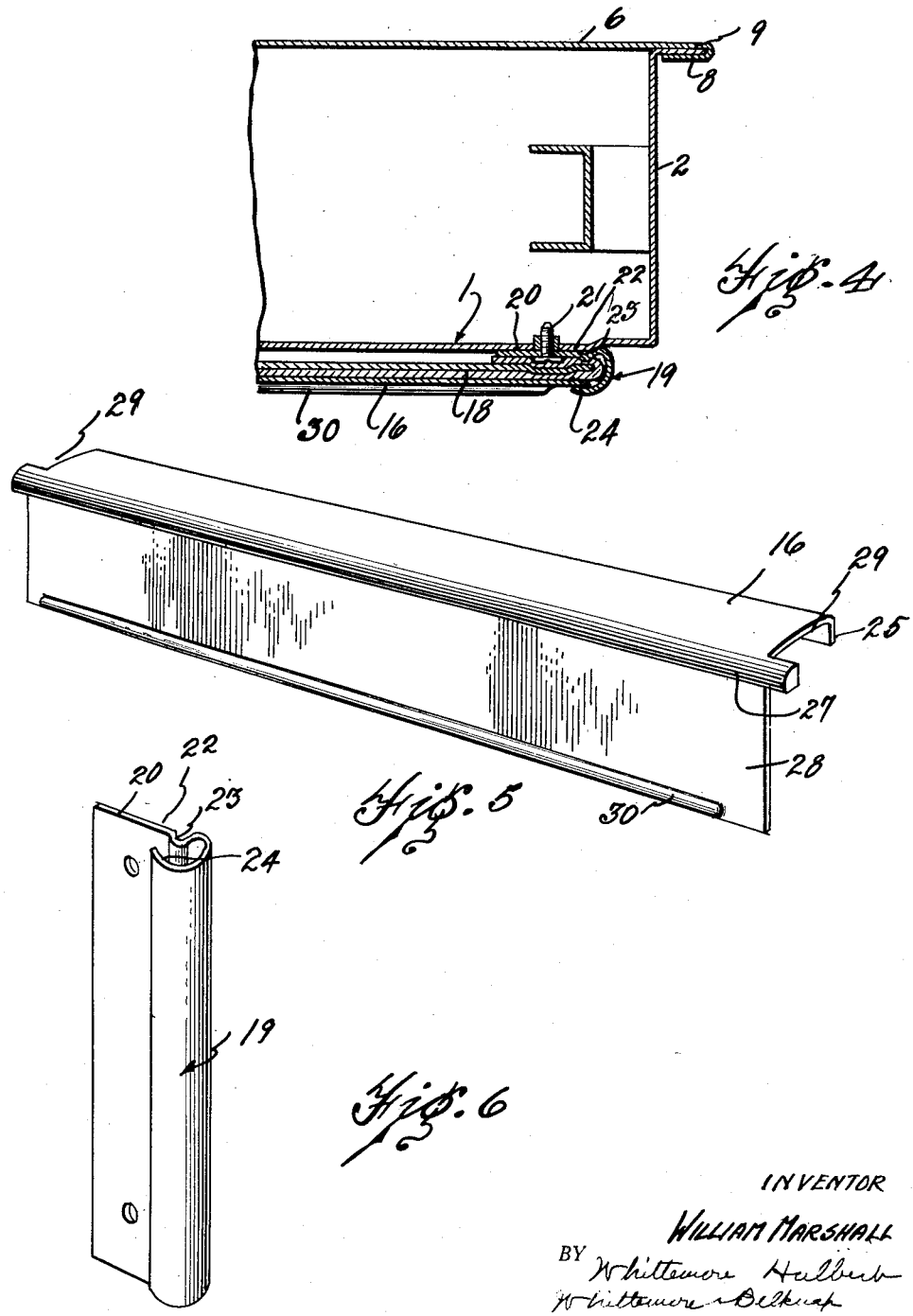

1,717,238

UNITED STATES PATENT OFFICE.

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN.

DOOR CONSTRUCTION.

Application filed December 13, 1926. Serial No. 154,588.

This invention relates generally to door constructions for vehicle bodies and consists of certain novel features of construction, combinations and arrangements of parts as will be more fully described and particularly pointed out in the appended claims.

In the accompanying drawing:

Figure 1 is a fragmentary perspective view of a door embodying my invention.

Figure 2 is a vertical sectional view taken on the line 2—2 of Figure 1.

Figure 3 is a cross sectional view taken on the line 3—3 of Figure 1.

Figure 4 is a horizontal sectional view taken on the line 4—4 of Figure 1.

Figure 5 is a detail perspective view of the garnish molding.

Figure 6 is a detail perspective view of one of the strips of molding used to retain the trimming material and garnish molding in place.

Referring now to the drawing, 1 is an inner panel of a door embodying my invention. As shown, this panel is provided throughout its length at the side edges thereof with inwardly extending lateral flanges 2 and is provided at the upper end thereof with a suitable window opening 3. Preferably this panel is provided at the lower edge of the window opening with an inwardly extending substantially horizontal flange 4 and is provided at the sides of the window opening with inwardly extending lateral flanges 5 which are preferably parallel to the lateral flanges 2.

6 is the outer panel of the door and preferably constitutes the exterior finish thereof. As shown this outer panel 6 is spaced from the inner panel 1 and is provided at its upper end with a suitable window opening 7 that registers with the opening 3. Preferably this outer panel 6 overlaps the lateral flanges 2 of the inner panel and is provided at its longitudinal edges with suitable return-bent flanges 8 that are secured preferably by a welding operation to suitable lateral flanges 9 at the inner edges of the flanges 2. To provide a neat appearance around the window opening and at the same time provide a rigid construction, the outer panel 6 is provided at the side and bottom edges of the window opening 7 with inwardly extending flanges 10 and 11 respectively. Preferably the side flanges 10 are provided at their inner edges with laterally extending flanges 12 that are substatnially parallel to the outer panel 6 and terminate in inwardly extending flanges 13 that in turn extend at substantially right angles to the flanges 12 and are rigidly secured, preferably by a welding operation to the inwardly extending lateral flanges 5 of the inner panel, while the flange 11 at the lower edge of the window opening extends inwardly corresponding to the side flanges 10 but preferably is provided at its inner edge with a close return-bent portion 14 that terminates at its inner edge in a depending flange 15. Thus box like pillars are formed at each side of the window opening to take care of weaving and twisting actions to which the door may be subjected, and the usual separate or auxiliary upright members or pillars of relatively heavy gauge metal have been dispensed with entirely. It will also be observed that the inwardly extending flange 11 terminates short of the inwardly extending flange 4 of the inner panel but is disposed in a slightly higher plane so as to be in substantially the same horizontal plane with the garnish molding 16 that is used as a portion of the interior finish of the door.

Cooperating with the garnish molding 16 to provide a neat interior finish for the door, are strips 17 of molding which correspond to the members 12 in my co-pending U. S. application filed June 28, 1926, Ser. No. 119,231, a panel 18 of fabric trimming material, and strips 19 of molding that in the present instance are used to hold both the garnish molding 16 and the panel 18 of fabric trimming material in place. As shown, these strips 19 are channel-shape and have the inner sides 20 thereof secured by suitable headed elements 21 to the inner panel 1. Preferably the inner sides 20 of these strips are provided adjacent to the bases 22 thereof with longitudinally extending beads 23 which project inwardly and are adapted to cooperate with the outer sides 24 of said strips to effectively hold the edges of the panel 18 of fabric trimming material. In the present instance the garnish molding 16 comprises an imperforate strip of metal which is provided at its inner edge with a depending flange 25 that overlaps a depending flange 26 at the inner edge of the flange 4 of the inner panel, and is provided at its outer edge with an open return-bent portion 27 that in turn is provided at its inner edge with a depending flange or apron 28 that overlaps the upper edge and outer face of the panel 18 of trimming material. Preferably the garnish molding 16 is cut away at its opposite ends as shown at 29 to receive the adjacent upright portions 5 of the inner panel, while the depending flange 28 is preferably provided at its lower edge with the outwardly extending open return-bent portion or bead 30 which corresponds to the open return-bent portion 27 at the upper edge thereof. As shown this depending flange 28 terminates short of the ends of the garnish molding but has its end portions received in and concealed by the channel strips 19, while the bead 30 preferably terminates short of the ends of the depending flange 28 so as to allow a snug engagement between the latter and the outer sides 24 of the strips 19. As shown the molding strips 17 rest upon the garnish molding 16 and are secured by suitable screws 31 to the lateral flanges 5 of the inner panel. Preferably these screws engage nuts 32 that are non-rotatably received in the channel-shaped portions 33 formed in suitable reinforcing members 34 that are secured to the inner faces of the lateral flanges 5. To facilitate assembly the inner panel 1 is provided with suitable openings 35 which register with the inner open ends of the channel portions 33 of the reinforcing members to enable the nuts 32 to be readily inserted into said channels. Inasmuch as the strips 17 have lateral flanges 36 which are spaced inwardly from the outer edges of the strips which overlie flanges 5 of the inner panel 1, it is apparent that the openings 35 and the channel portions 33 will be closed as well as concealed when the strips 17 are in place upon the inner panel. Furthermore it will be apparent that the garnish molding 16 cannot work loose or become accidentally disengaged from the channel strips 17 when the molding strips 19 are assembled, hence the garnish molding is effectively held in place without the use of any separate or auxiliary securing elements such as nails, bolts, nuts and screws and the like. This also obviates the necessity of special opening or socket forming operations to receive such headed elements and provides a neat finish for the door. A material saving in time, labor, and expense has thus been effected as a result of my novel manner of securing the garnish molding in place.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. In a door, the combination with a panel having a window opening therein, of a removable garnish molding extending across the panel at the lower edge of the said opening, and securing means for said molding including means, at the side edges of the panel, receiving portions of the molding, and finish strips secured to said panel at the sides of said opening and holding said garnish molding in place with respect to the window opening and means aforesaid.

2. In a door, the combination with a panel having a window opening therein, a garnish molding at the lower edge of said opening, and a panel of trimming material upon the panel aforesaid below said garnish molding, of means carried by said first mentioned panel holding both the panel of trimming material and a portion of said molding.

3. In a door, the combination with a panel, of fabric trimming material on said panel, a strip of garnish molding, and a common securing means engaging corresponding edges of said trimming material and of said molding for securing said trimming material and molding to said panel.

4. In a door, the combination with a metal panel having a window opening therein, of a panel of fabric trimming material on the first mentioned panel, a strip of garnish molding concealing the upper edge of said panel of trimming material and disposed at the lower edge of the window opening, and a common securing means for said trimming material and molding said securing means being carried by said first mentioned panel and being arranged in overlapping engagement with adjacent end portions of said trimming material and said molding.

5. In a door, the combination with an inner panel, and a panel of trimming material therefor, of a garnish molding concealing a portion of the inner panel and an edge of said trimming material, and securing means for the trimming material including strips carried by the inner panel having portions receiving the side edges of said trimming material and the end portions of said garnish molding.

6. In a door, the combination with an inner panel, and a panel of trimming material therefor, of a garnish molding concealing a portion of the inner panel and an edge of said trimming material, and strips of molding carried by said inner panel and holding said garnish molding and trimming material.

7. In a door, the combination with an inner panel, a panel of trimming material therefor, and a garnish molding concealing an edge of said trimming material and having a depending flange overlapping a portion of said trimming material, of molding strips at the side edges of the first mentioned panel receiving the side edges of the trimming material and the ends of said depending flange.

8. A garnish molding for doors comprising a strip of metal having a depending flange at one longitudinal edge, an open return bent portion at the other longitudinal edge thereof, and a flange depending from the inner edge of said open return-bent portion and disposed substantially parallel to the depending flange aforesaid, said strip being cut away at its ends to receive portions of a door and said last mentioned depending flange having a longitudinally extending bead corresponding to the return-bent portion aforesaid and terminating short of the ends of said depending flange so as to permit the insertion of said flange into a suitable channel-shaped retainer strip.

9. In a door, the combination with an inner panel having a window opening therein and a reinforcing member formed with a substantially channel-shaped portion arranged at one side of said window opening, and a strip of molding concealing the inner side of said channel-shaped portion and having a lateral flange overlapping the inner face of said panel, of securing means for said molding including a nut in said channel-shaped portion aforesaid, and a headed element extending transversely of said molding and engaging said nut, the said inner panel having an opening therein registering with the channel-shaped portion of said reinforcing element to permit the ready insertion of said nut into the reinforcing element preliminary to the assembly of said molding with said inner panel, the location of said opening being such that the said opening is closed and entirely concealed by the lateral flange of said molding when the latter is applied to the panel.

10. In combination, a door, a panel of trimming material on one side of said door, a garnish molding above said panel and having an apron overlapping the upper edge and outer face of said panel, and attaching means for said molding including means carried by the door and engaging said apron.

11. In combination, a door, a panel of trimming material on one side of said door, retaining means for said panel including metal parts carried by said door and overlapping the upright edges of said panel, a garnish molding above said panel and having an apron overlapping the upper edges and outer face of said panel and having end portions of the apron received between said retaining metal parts and the outer face of said panel, and strips secured to said door above said garnish molding and holding said molding in assembled position with respect to said panel of trimming material and retaining metal parts.

12. In combination, a door having a window opening, a panel of trimming material on one side of the door below said opening, and a separate removable garnish molding having a portion constituting a window sill and extending transversely of said door above said panel and having a depending apron overlapping the upper edge and outer face of said panel.

13. In combination, a door having a window opening, a panel of trimming material on one side of the door below said opening, a strip of garnish molding having a portion constituting a window sill and extending transversely of the door above the panel of trimming material and having a depending apron overlapping the upper edge and outer face of said panel, and securing means for said molding including means extending longitudinally of the door and overlapping portions of said molding.

14. In combination, a door having a window opening, a panel of trimming material on one side of the door below said opening, a strip of garnish molding extending transversely of the door above said panel and having a depending apron extending transversely of the door and overlapping the upper edge and outer face of said panel, and securing means for said molding including metal strips extending longitudinally of the door and having portions disposed against portions of said molding.

15. In combination, a door having a window opening, a panel of trimming material on one side of the door below said opening, a strip of garnish molding extending over the upper edge of said panel of trimming material and constituting a window sill, and having a depending apron overlapping and concealing a portion of the outer face of said panel, and common securing means for said panel of trimming material and said molding including strips extending longitudinally of the door beneath the transversely extending portion aforesaid of said molding and overlapping and embracing the end portions of said apron and the side edges of said panel.

16. In a door assembly, the combination with an inner door panel, and a panel of trimming material on one side of said inner panel, of channel shaped strips disposed at and extending longitudinally of the upright side edges of said door panel receiving the side edges of said panel of trimming material, and a garnish molding having a strip portion constituting a window sill extending over the upper edge of said panel of trimming material and concealing the joint between said panel of trimming material and said inner door panel, and having an apron portion depending from said strip portion and overlapping and concealing a portion of one side of the panel of trimming material with the upright side edges of said apron received in and concealed by the channel shaped strips aforesaid.

17. In combination, a door, a panel of trimming material on one side of said door, a garnish molding having a portion constituting a window sill above and overlapping the upper edge of the panel of trimming material and having an apron overlapping the outer face of said panel, and attaching means for said molding including strips secured to the door at the upright side edges thereof overlapping the upright side edges of said apron.

18. In a door assembly, the combination with a door panel, a garnish molding having a portion constituting a window sill extending over an edge of said panel and having a depending apron overlapping one side of said panel, metal finish strips secured to said panel at the upright side edges thereof, and a panel of trimming material upon one side of said door panel and having edge portions thereof concealed by said apron and said finish strips.

In testimony whereof I affix my signature.

WILLIAM MARSHALL.